(12) United States Patent
Oizumi

(10) Patent No.: US 12,545,534 B2
(45) Date of Patent: Feb. 10, 2026

(54) POWER TRANSMISSION APPARATUS, MEDIUM TRANSPORT APPARATUS, RECORDING APPARATUS, CONTROL METHOD OF POWER TRANSMISSION APPARATUS, AND CONTROL METHOD OF MEDIUM TRANSPORT APPARATUS

(71) Applicant: SEIKO EPSON CORPORATION, Tokyo (JP)

(72) Inventor: Takao Oizumi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 18/161,408

(22) Filed: Jan. 30, 2023

(65) Prior Publication Data

US 2023/0242357 A1    Aug. 3, 2023

(30) Foreign Application Priority Data

Jan. 31, 2022   (JP) ................................. 2022-012613

(51) Int. Cl.
*B65H 3/06*   (2006.01)

(52) U.S. Cl.
CPC .......... *B65H 3/0669* (2013.01); *B65H 3/0684* (2013.01); *B65H 2403/724* (2013.01)

(58) Field of Classification Search
CPC .......... B65H 2403/70; B65H 2403/724; B65H 3/0669; B65H 5/06
See application file for complete search history.

(56) References Cited

U.S. PATENT DOCUMENTS

| 7,367,733 | B2 * | 5/2008 | Bedzyk ................... | B41J 13/025 |
| | | | | 400/636 |
| 8,683,904 | B2 * | 4/2014 | Mitsuhashi ............ | B41J 13/025 |
| | | | | 271/272 |
| 9,738,468 | B2 * | 8/2017 | Esaka ..................... | B65H 5/062 |
| 9,969,582 | B2 * | 5/2018 | Morimoto ................ | B65H 7/20 |
| 10,513,403 | B2 | 12/2019 | Okada et al. | |
| 2006/0180971 | A1 | 8/2006 | Maruyama | |
| 2012/0024124 | A1 | 2/2012 | Mitsuhashi | |

(Continued)

FOREIGN PATENT DOCUMENTS

| JP | H01-299133 A | 12/1989 |
| JP | H10-035938 A | 2/1998 |

(Continued)

*Primary Examiner* — Howard J Sanders
(74) *Attorney, Agent, or Firm* — WORKMAN NYDEGGER

(57) ABSTRACT

A power transmission apparatus includes a drive source, a power transmission switching section configured to switch between a transmission state in which power of the drive source is transmitted to a driven section and a non-transmission state in which power of the drive source is not transmitted to the driven section, a load switching section configured to switch between a first load state, which is a load while the driven section is driven, and a second load state, which is a load smaller than the load of the first load state, and a control section, wherein the control section switches the power transmission switching section from the non-transmission state to the transmission state while the load is in the second load state, and then uses the load switching section to switch the load from the second load state to the first load state.

14 Claims, 9 Drawing Sheets

(56) References Cited

U.S. PATENT DOCUMENTS

| | | | |
|---|---|---|---|
| 2013/0069300 A1* | 3/2013 | Tamehira | B65H 7/02 271/225 |
| 2019/0144223 A1 | 5/2019 | Okada et al. | |
| 2020/0269610 A1 | 8/2020 | Ao et al. | |

FOREIGN PATENT DOCUMENTS

| | | |
|---|---|---|
| JP | 2003128289 | 5/2003 |
| JP | 2005075490 | 3/2005 |
| JP | 2005-145674 A | 6/2005 |
| JP | 2007-276966 A | 10/2007 |
| WO | 2017/199673 | 11/2017 |

* cited by examiner

POWER TRANSMISSION APPARATUS, MEDIUM TRANSPORT APPARATUS, RECORDING APPARATUS, CONTROL METHOD OF POWER TRANSMISSION APPARATUS, AND CONTROL METHOD OF MEDIUM TRANSPORT APPARATUS

The present application is based on, and claims priority from JP Application Serial Number 2022-012613, filed Jan. 31, 2022, the disclosure of which is hereby incorporated by reference herein in its entirety.

BACKGROUND

1. Technical Field

The present disclosure relates to a power transmission apparatus that transmits power of a drive source to a driven section. The present disclosure also relates to a medium transport apparatus including the power transmission apparatus. The present disclosure also relates to a recording apparatus including the medium transport apparatus. The present disclosure also relates to a control method for the power transmission apparatus and a control method for the medium transport apparatus.

2. Related Art

In a printer, a sheet-feed type scanner, or the like, a roller pair configured by a drive roller and a driven roller is provided in a medium transport path. Sometimes, the driven roller may be configured to advance and retreat with respect to the drive roller, as shown in the JP-A-10-35938.

JP-A-10-35938 discloses a configuration in which a head movement unit having a line head, which is a recording head, a maintenance unit having a cap section that caps the line head, and a second maintenance unit having a blade that wipes the line head are movable in directions orthogonal to each other.

In a case where a clutch is provided in a driving force transmission path from a motor to a drive roller and on/off switching of driving force transmission from the motor to the drive roller is performed, when the clutch is turned on after the motor is started, backlash of gears disappears and meshing noise occurs when teeth of the gears mesh with each other.

SUMMARY

To solving the above problems, a power transmission apparatus according to a present disclosure includes a drive source, a power transmission switching section configured to switch between a transmission state in which power of the drive source is transmitted to a driven section and a non-transmission state in which power of the drive source is not transmitted to the driven section, a load switching section configured to switch between a first load state, which is a load while the driven section is driven, and a second load state, which is a load smaller than the load of the first load state, and a control section configured to control the drive source, the power transmission switching section, and the load switching section, wherein the control section switches the power transmission switching section from the non-transmission state to the transmission state while the load is in the second load state, and then uses the load switching section to switch the load from the second load state to the first load state.

Further, a medium transport apparatus according to the present disclosure includes the power transmission apparatus and a medium transport path configured to transport a medium, wherein the driven section is a drive roller configured to apply feeding force to the medium in the medium transport path.

Further, a recording apparatus according to the present disclosure includes the medium transport apparatus and a recording section configured to perform recording on a medium being transported.

A control method for a power transmission apparatus, the power transmission apparatus including a drive source, a power transmission switching section configured to switch between a transmission state in which power of the drive source is transmitted to a driven section and a non-transmission state in which power of the drive source is not transmitted to the driven section, and a load switching section configured to switch between a first load state, which is a load while the driven section is driven, and a second load state, which is a load smaller than the load of the first load state, the control method includes switching the power transmission switching section from the non-transmission state to the transmission state while the load is in the second load state, and then using the load switching section to switch the load from the second load state to the first load state.

A control method according to the present disclosure for a power transmission apparatus including a drive source, a power transmission switching section configured to switch between a transmission state in which power of the drive source is transmitted to a drive roller and a non-transmission state in which power of the drive source is not transmitted to the drive roller, and a load switching section configured to switch between a first load state, which is a load when driving the drive roller, and a second load state, in which the load is smaller than the load in the first load in state, wherein when a plurality of media are consecutively transported, the control method executes the following processes, switching the power transmission switching section from the non-transmission state to the transmission state while the load is in the second load state, and then using the load switching section to switch the load from the second load state to the first load state to transport a first medium among the plurality of media, when the first medium is transported by a predetermined amount, switching the power transmission switching section from the transmission state to the non-transmission state, and subsequently, maintaining the load in the first load state and, each time a medium is transported, switching the power transmission switching section from the non-transmission state to the transmission state and from the transmission state to the non-transmission state.

A control method according to the present disclosure for a power transmission apparatus including a drive source, a power transmission switching section configured to switch between a transmission state in which power of the drive source is transmitted to a drive roller and a non-transmission state in which power of the drive source is not transmitted to the drive roller, and a load switching section configured to switch between a first load state, which is a load when driving the drive roller, and a second load state, in which the load is smaller than the load in the first load in state, wherein when a plurality of media are consecutively transported, the control method executes the following processes each time a single sheet of medium is transported, a first control of switching the power transmission switching section from the non-transmission state to the transmission state while the load is in the second load state, and then using the load switching section to switch the load from the second load state to the first load state, a second control of, when the medium is transported by a predetermined amount, switching the power transmission switching section from the transmission state to the non-transmission state, and a third control of using the load switching section to switch the load from the first load state to the second load state.

DESCRIPTION OF EMBODIMENTS

Figure 1:
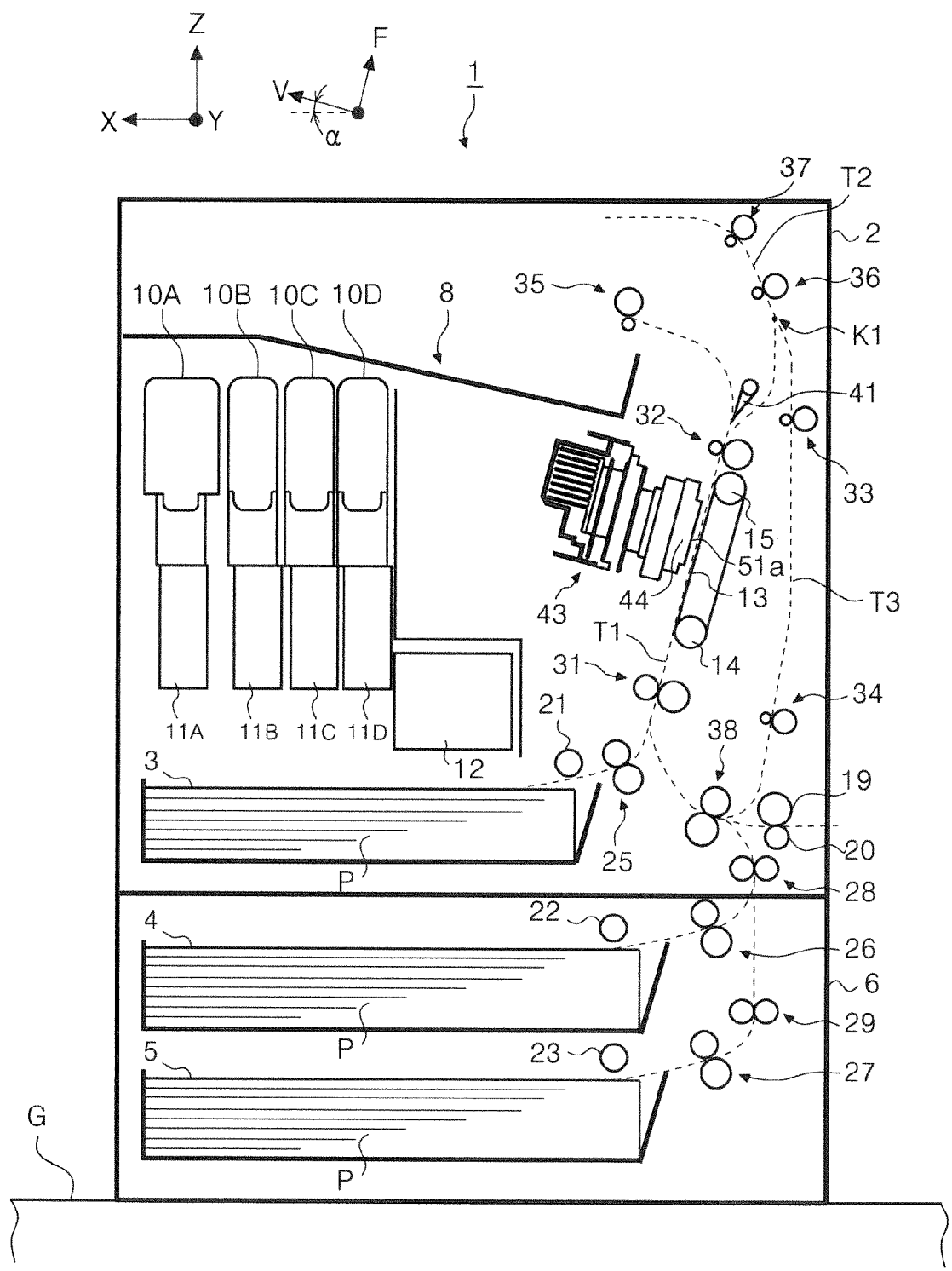
FIG. 1 is a diagram illustrating a medium transport path of a printer.

Hereinafter, the present disclosure will be schematically described.

A power transmission apparatus according to a first aspect includes
a drive source, a power transmission switching section configured to switch between a transmission state in which power of the drive source is transmitted to a driven section and a non-transmission state in which power of the drive source is not transmitted to the driven section, a load switching section configured to switch between a first load state, which is a load while the driven section is driven, and a second load state, which is a load smaller than the load of the first load state, and a control section configured to control the drive source, the power transmission switching section, and the load switching section, wherein the control section switches the power transmission switching section from the non-transmission state to the transmission state while the load is in the second load state, and then uses the load switching section to switch the load from the second load state to the first load state.

According to this aspect, the control section switches the power transmission switching section from the non-transmission state to the transmission state while the load is in the second load state, in which the load is smaller than that in the first load state, so it is possible to suppress meshing noise that occurs when the teeth of two gears mesh with each other when the power transmission switching section is switched from the non-transmission state to the transmission state.

A second aspect is the first aspect, wherein the load switching section is constituted by a solenoid.

According to this aspect, since the load switching section is constituted by the solenoid, the load switching section can be realized with a simple configuration.

A third aspect is the first or second aspect, wherein the power transmission switching section is constituted by an electromagnetic clutch.

According to this aspect, since the power transmission switching section is constituted by the electromagnetic clutch, the power transmission switching section can be realized with a simple configuration.

A medium transport apparatus according to a fourth aspect, includes the power transmission apparatus according to any one of the first to third aspects and a medium transport path configured to transport a medium, wherein the driven section is a drive roller configured to apply feeding force to the medium in the medium transport path.

According to this aspect, in the medium transport apparatus, it is possible to obtain the operations and effects of any one of the first to third aspects described above.

A fifth aspect is the fourth aspect, that further includes a driven roller configured to advance and retreat with respect to the drive roller, wherein the load switching section forms the first load state by bringing the driven roller into contact with the drive roller, and forms the second load state by separating the driven roller from the drive roller.

According to this aspect, in a configuration in which the first load state and the second load state are switched by the driven roller advancing and retreating with respect to the drive roller, the operations and effects of the fourth aspect described above are obtained.

A sixth aspect is the fourth aspect, that further includes a medium support section configured to support the medium before feeding, wherein the drive roller is a pickup roller configured to advance and retreat with respect to the medium supported by the medium support section and the load switching section forms the first load state by bringing the pickup roller into contact with the medium, and forms the second load state by separating the pickup roller from the medium.

According to this aspect, in a configuration in which the first load state and the second load state are switched by the pickup roller advancing and retreating with respect to the medium supported by the medium support section, the operations and effects of the fourth aspect described above are obtained.

A seventh aspect is the fifth or sixth aspect, wherein when a plurality of media are consecutively transported, the control section executes the following processes, switching the power transmission switching section from the non-transmission state to the transmission state while the load is in the second load state, and then using the load switching section to switch the load from the second load state to the first load state to transport a first medium among the plurality of media, when the first medium is transported by a predetermined amount, switching the power transmission switching section from the transmission state to the non-transmission state, and for a second and subsequent media among the plurality of media, maintaining the load in the first load state and, each time a medium is transported, switching the power transmission switching section from the non-transmission state to the transmission state and from the transmission state to the non-transmission state.

According to this aspect, since the control section maintains the load in the first load state in the case of the second and subsequent media among the plurality of media, it is possible to improve quietness by suppressing generation of sound caused by the load switching section.

An eighth aspect is the fifth or sixth aspect, wherein when a plurality of media are consecutively transported, the control section executes the following processes each time a single sheet of medium is transported, a first control of switching the power transmission switching section from the non-transmission state to the transmission state while the load is in the second load state, and then using the load switching section to switch the load from the second load state to the first load state, a second control of, when the medium is transported by a predetermined amount, switching the power transmission switching section from the transmission state to the non-transmission state, and a third control of using the load switching section to switch the load from the first load state to the second load state.

According to this aspect, since the control section performs the state switching by the power transmission switching section and the switching of the load by the load switching section each time one medium is transported, a period in which a high load is applied to the drive source can be shortened, and wear of a member configuring a power transmission path from the drive source to the driven section can be suppressed.

A ninth aspect is the fifth or sixth aspect, wherein when a plurality of media are consecutively transported, the control section executes the following processes, switching the power transmission switching section from the non-transmission state to the transmission state while the load is in the second load state, and then using the load switching section to switch the load from the second load state to the first load state to transport a first medium among the plurality of media, when the first medium is transported by a predetermined amount, using the load switching section to switch the load from the first load state to the second load state, and for a second and subsequent media among the plurality of media, maintaining the power transmission switching section in the transmission state and, each time a medium is transported, using the load switching section to switch from the second load state to the first load state and to switch from the first load state to the second load state.

According to this aspect, since the control section maintains the power transmission switching section in the transmission state in the case of the second and subsequent media among the plurality of media, it is possible to improve quietness by suppressing generation of sound caused by the power transmission switching section.

A tenth aspect is any of the seventh to ninth aspects, wherein the drive source is a motor, when the first medium is to be transported and the power transmission switching section switches from the non-transmission state to the transmission state while the load is in the second load state, the control section sets the speed of the motor to a first speed, and, after using the load switching section to switch the load from the second load state to the first load state, sets the speed of the motor to a second speed higher than the first speed, and transports the medium at the second speed.

According to this aspect, when the first medium is to be transported and the power transmission switching section switches from the non-transmission state to the transmission state while the load is in the second load state, the control section sets the speed of the motor to a first speed, which is slower than the second speed used when the medium is transported, so it is possible to further suppress the meshing noise generated when the teeth of the two gears mesh with each other in a case where the power transmission switching section is switched from the non-transmission state to the transmission state.

A recording apparatus is an eleventh aspect, that includes the medium transport apparatus according to any one of the fourth to tenth aspects, wherein a recording section configured to perform recording on a medium being transported.

According to this aspect, the operations and effects of any of the fourth to tenth aspects described above can be obtained in the recording apparatus.

A control method according to a twelfth aspect is for a power transmission apparatus including a drive source, a power transmission switching section configured to switch between a transmission state in which power of the drive source is transmitted to a driven section and a non-transmission state in which power of the drive source is not transmitted to the driven section, and a load switching section configured to switch between a first load state, which is a load while the driven section is driven, and a second load state, which is a load smaller than the load of the first load state, the control method includes switching the power transmission switching section from the non-transmission state to the transmission state while the load is in the second load state, and then using the load switching section to switch the load from the second load state to the first load state.

According to this aspect, when the load is in the second load state, the power transmission switching section is switched from the non-transmission state to the transmission state, so it is possible to suppress meshing noise in which the teeth of the two gears mesh with each other when the power transmission switching section is switched from the non-transmission state to the transmission state.

A thirteenth aspect is the control method according to the twelfth aspect for the power transmission apparatus, wherein the driven section is a drive roller that applies feeding force to a medium and when a plurality of media are consecutively transported, the control method executes the following processes, switching the power transmission switching section from the non-transmission state to the transmission state while the load is in the second load state, and then using the load switching section to switch the load from the second load state to the first load state to transport a first medium among the plurality of media, when the first medium is transported by a predetermined amount, switching the power transmission switching section from the transmission state to the non-transmission state, and subsequently, maintaining the load in the first load state and, each time a medium is transported, switching the power transmission switching section from the non-transmission state to the transmission state and from the transmission state to the non-transmission state.

In other words, the control method according to the thirteenth aspect is for a medium transport apparatus including a drive source, a power transmission switching section configured to switch between a transmission state in which power of the drive source is transmitted to a drive roller and a non-transmission state in which power of the drive source is not transmitted to the drive roller, and a load switching section configured to switch between a first load state, which is a load when driving the drive roller, and a second load state, in which the load is smaller than the load in the first load in state, wherein when a plurality of media are consecutively transported, the control method includes switching the power transmission switching section from the non-transmission state to the transmission state while the load is in the second load state, and then using the load switching section to switch the load from the second load state to the first load state to transport a first medium among the plurality of media, when the first medium is transported by a predetermined amount, switching the power transmission switching section from the transmission state to the non-transmission state, and subsequently, maintaining the load in the first load state and, each time a medium is transported, switching the power transmission switching section from the non-transmission state to the transmission state and from the transmission state to the non-transmission state.

According to this aspect, when the load is in the second load state, the power transmission switching section is switched from the non-transmission state to the transmission state, so it is possible to suppress meshing noise in which the teeth of the two gears mesh with each other when the power transmission switching section is switched from the non-transmission state to the transmission state.

In addition, since the load is maintained in the first load state for the second and subsequent media among the plurality of media, it is possible to improve quietness by suppressing generation of sound caused by the load switching section.

A fourteenth aspect is the control method of the twelfth aspect for the power transmission apparatus, wherein the driven section is a drive roller that applies feeding force to a medium and when a plurality of media are consecutively transported, the control method executes the following processes each time a single sheet of medium is transported, a first control of switching the power transmission switching section from the non-transmission state to the transmission state while the load is in the second load state, and then using the load switching section to switch the load from the second load state to the first load state, a second control of, when the medium is transported by a predetermined amount, switching the power transmission switching section from the transmission state to the non-transmission state, and a third control of using the load switching section to switch the load from the first load state to the second load state.

A control method for a medium transport apparatus according to fourteenth aspect, the medium transport apparatus including a drive source, a power transmission switching section configured to switch between a transmission state in which power of the drive source is transmitted to a drive roller and a non-transmission state in which power of the drive source is not transmitted to the drive roller, and a load switching section configured to switch between a first load state, which is a load when driving the drive roller, and a second load state, in which the load is smaller than the load in the first load in state, wherein when a plurality of media are consecutively transported, the control method executes the following processes each time a single sheet of medium is transported, a first control of switching the power transmission switching section from the non-transmission state to the transmission state while the load is in the second load state, and then using the load switching section to switch the load from the second load state to the first load state, when the medium is transported by a predetermined amount, switching the power transmission switching section from the transmission state to the non-transmission state as a second control, and a third control of using the load switching section to switch the load from the first load state to the second load state.

According to this aspect, when the load is in the second load state, the power transmission switching section is switched from the non-transmission state to the transmission state, so it is possible to suppress meshing noise in which the teeth of the two gears mesh with each other when the power transmission switching section is switched from the non-transmission state to the transmission state.

Further, since the state switching by the power transmission switching section and the switching of the load by the load switching section are performed each time one medium is transported, the load applied to the drive source can be suppressed.

Hereinafter, the present disclosure will be specifically described.

Hereinafter, an inkjet printer 1 that performs recording by ejecting ink, which is an example of a liquid, onto a medium, represented by recording paper, will be described as an example of a recording apparatus. Hereinafter, the inkjet printer 1 will be abbreviated as printer 1. Since the printer 1 transports the medium, the printer 1 is also an example of a medium transport apparatus.

An X-Y-Z coordinate system illustrated in the drawings is an orthogonal coordinate system, and a Y-axis direction is a direction intersecting with a transport direction of the medium, that is, a medium width direction, and is also an apparatus depth direction. In the Y-axis direction, a +Y direction is a direction from an apparatus front surface toward an apparatus rear surface, and a −Y direction is a direction from the apparatus rear surface toward the apparatus front surface.

An X-axis direction is an apparatus width direction, and a +X direction is to the left side and a −X direction is to the right side as viewed from an operator of the printer 1. A Z-axis direction is a vertical direction, which is a normal direction with respect to a placement surface G of the printer 1, that is, an apparatus height direction. In the Z-axis directions, a +Z direction is the upward direction and a −Z direction is the downward direction.

Hereinafter, a direction in which the medium is transported may be referred to as "downstream", and an opposite direction may be referred to as "upstream". In FIG. 1, a medium transport path is indicated by a dashed line. In the printer 1, the medium is transported through the medium transport path indicated by the dashed line in FIG. 1.

An F-axis direction is a medium transport direction between a line head 44 and a transport belt 13 (these will be described later), that is, in a recording region, and a +F direction is downstream in the transport direction and an opposite −F direction is upstream in the transport direction. A V-axis direction is orthogonal to the F-axis direction.

Hereinafter, the medium transport path in the printer 1 will be described with reference to FIG. 1. The printer 1 is configured such that an additional unit 6 can be coupled to a lower portion of an apparatus main body 2, and FIG. 1 illustrates a state in which the additional unit 6 is coupled.

The apparatus main body 2 is provided with a first medium cassette 3 for accommodating the medium in the lower portion thereof, and when the additional unit 6 is coupled, a second medium cassette 4 and a third medium cassette 5 are further provided below the first medium cassette 3. The medium cassettes are examples of a medium support section that supports the medium before feeding.

The medium cassettes are provided with a pickup roller that feeds the accommodated medium in the −X direction. Pickup rollers 21, 22, and 23 are pickup rollers provided for the first medium cassette 3, the second medium cassette 4, and the third medium cassette 5, respectively, and are provided so as to be able to advance and retreat with respect to the medium accommodated in the medium cassettes.

The medium cassettes are provided with a feed roller pair for feeding the medium fed in the −X direction obliquely upward. Feed roller pairs 25, 26, and 27 are feed rollers provided for the first medium cassette 3, the second medium cassette 4, and the third medium cassette 5, respectively.

In the following description, unless otherwise specified, a "roller pair" is composed of a drive roller that is driven by a drive source to apply feed force to the medium, and a driven roller that is driven to rotate in contact with the drive roller or the medium.

The medium fed out from the third medium cassette 5 is sent to the transport roller pair 38 by transport roller pairs 29 and 28. The medium fed out from the second medium cassette 4 is sent to the transport roller pair 38 by the transport roller pair 28. The medium is nipped by the transport roller pair 38 and sent to the transport roller pair 31.

The medium fed out from the first medium cassette 3 is sent to the transport roller pair 31 by the feed roller pair 25 without passing through the transport roller pair 38.

Note that a feed roller 19 and a separation roller 20 provided in the vicinity of the transport roller pair 38 are roller pair that feeds the medium from a supply tray (not illustrated in FIG. 1).

The medium that receives feed force from the transport roller pair 31 is sent to a position between the line head 44, which is an example of a recording head, and the transport belt 13, that is, to a position facing the line head 44. Hereinafter, the medium transport path from the transport roller pair 31 to a transport roller pair 32 is referred to as a recording time transport path T1.

The line head 44 constitutes a head unit 43. The line head 44 performs recording by ejecting ink onto a surface of the medium. The line head 44 is an ink ejection head configured such that nozzles for ejecting ink cover the entire region in the medium width direction, and is configured as the ink ejection head capable of performing recording on the entire region in the medium width direction without moving in the medium width direction. However, the ink ejection head is not limited thereto, and may be a type that is mounted on a carriage and that ejects ink while moving in the medium width direction.

The head unit 43 is provided so as to be able to advance and retreat with respect to the recording time transport path T1, and is provided so as to be able to move between a recording position at which the head unit 43 advances to the recording time transport path T1 and performs recording on the medium, and a retreat position at which the head unit 43 retreats from the recording time transport path T1.

FIG. 1 shows a state in which the head unit 43 is in the recording position, and in this state, recording is performed on the medium.

Reference symbols 10A, 10B, 10C, and 10D denote ink containers as liquid containing sections. The ink to be eject from the line head 44 is supplied to the line head 44 from the ink containers via a tube (not shown). The ink containers 10A, 10B, 10C, and 10D are detachably provided with respect to the mounting sections 11A, 11B, 11C, and 11D, respectively.

Reference symbol 12 denotes a waste liquid container that stores ink as waste liquid ejected from the line head 44 toward a flushing cap (not shown) for maintenance.

The transport belt 13 is an endless belt which is wound around a pulley 14 and a pulley 15, and rotates when at least one of the pulley 14 and the pulley 15 is driven by a motor (not shown). The medium is transported to the position facing the line head 44 while clinging to the belt surface of the transport belt 13. A known attraction method such as an air suction method or an electrostatic attraction method can be adopted for attracting the medium to the transport belt 13.

Here, the recording time transport path T1 that passes through the position facing the line head 44 intersects both a horizontal direction and the vertical direction, and transports the medium upward. Accordingly, the V-axis direction, which is the movement direction of the head unit 43, also intersects both the horizontal direction and the vertical direction, and the inclination angle α of the V-axis direction with respect to the horizontal direction is smaller than 45°, more specifically, approximately 15°.

The V-axis direction may be parallel to the horizontal direction without being limited to the above-described configuration.

The medium on which recording has been performed on a first surface by the line head 44 is further transported upward by the transport roller pair 32 positioned downstream of the transport belt 13.

A flap 41 is provided downstream of the transport roller pair 32, and the transport direction of the medium is switched by the flap 41. When the medium is to be discharged as is, the medium transport path is switched by the flap 41 so as to be directed toward an upper transport roller pair 35, and the medium is discharged toward a discharge tray 8 by the transport roller pair 35.

When recording is performed on a second surface of the medium in addition to the first surface, the transport direction of the medium is directed to the branch position K1 by the flap 41. Then, the medium passes through the branch position K1 and enters the switch-back path T2. In the present embodiment, the switch-back path T2 is the medium transport path above the branch position K1. Transport roller pairs 36 and 37 are provided in the switch-back path T2. The medium that has entered the switch-back path T2 is transported upward by the transport roller pairs 36 and 37, and when the lower edge of the medium has passed through the branch position K1, the rotation direction of the transport roller pairs 36 and 37 is switched, whereby the medium is transported downward.

An inversion path T3 is connected to the switch-back path T2. In the present embodiment, the inversion path T3 is a medium transport path extending from the branch position K1 to the transport roller pair 38 through transport roller pairs 33 and 34.

The medium transported downward from the branch position K1 receives feed forces from the transport roller pairs 33 and 34, reaches the transport roller pair 38, turns over while curving around, and is sent to the transport roller pair 31.

The medium that is transported to the position facing the line head 44 again has its second surface, which is opposite to the first surface on which recording has already been performed, facing the line head 44. Accordingly, recording by the line head 44 can be performed on the second surface of the medium.

Figure 2:
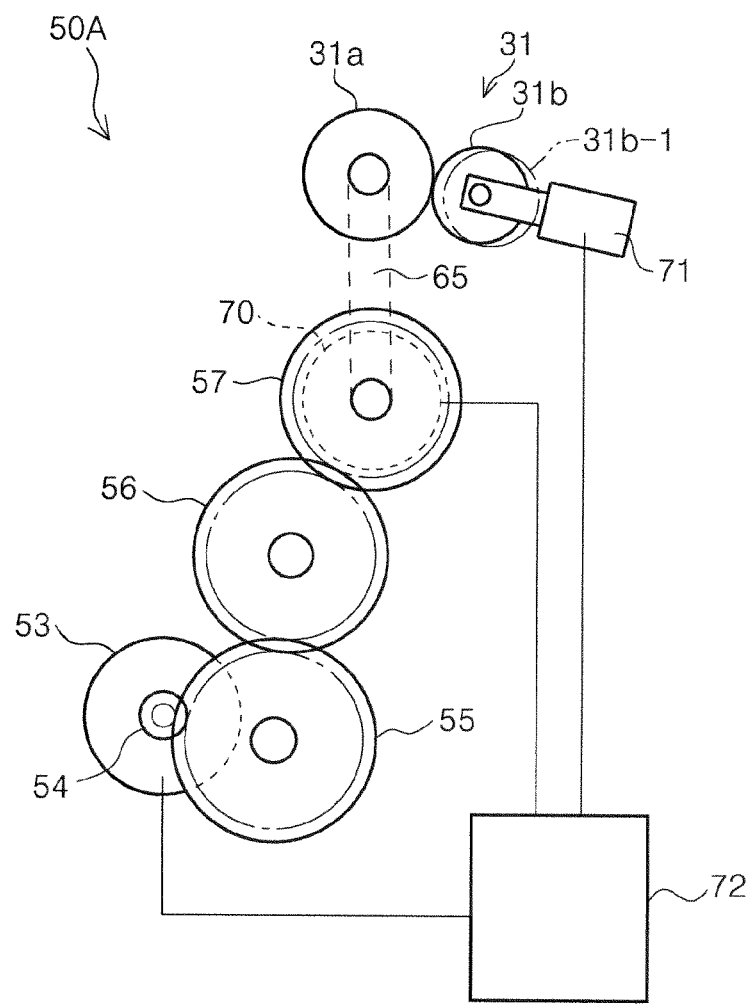
FIG. 2 is a diagram illustrating a configuration of a power transmission apparatus.

Next, the power transmission apparatus 50A will be described with reference to FIG. 2. The power transmission apparatus 50A includes a transport motor 53, as an example of a drive source, and a drive roller 31*a*, as an example of a driven section, that is driven by the transport motor 53. The power transmission apparatus 50A includes an electromagnetic clutch 70 as an example of a power transmission switching section that is switchable between a transmission state in which the power of the transport motor 53 is transmitted to the drive roller 31*a* and a non-transmission state in which the power of the transport motor 53 is not transmitted to the drive roller 31*a*. The electromagnetic clutch 70 is brought into the non-transmission state by being turned off, and into the transmission state by being turned on. In addition, the power transmission apparatus 50A includes a solenoid 71 as an example of a load switching section switchable between a first load state which is a load when the drive roller 31*a* is driven and a second load state which is a load is smaller than the first load state.

The power transmission apparatus 50A includes a control section 72 for controlling the transport motor 53, the electromagnetic clutch 70, and the solenoid 71.

The control section 72 includes a non-volatile memory (not illustrated), and the non-volatile memory stores a program for realizing control described below, parameters necessary for executing the program, and the like.

The drive roller 31*a* is a roller that constitutes the transport roller pair 31 (see FIG. 1). The transport roller pair 31 includes the drive roller 31*a* and a driven roller 31*b* that can advance and retreat with respect to the drive roller 31*a*. However, the drive roller 31*a* may be configured to advance and retreat with respect to the driven roller 31*b*. The transport roller pair 31 transports the medium by rotating the drive roller 31*a* in a state in which the medium is nipped between the drive roller 31*a* and the driven roller 31*b*. In FIG. 2, the driven roller 31*b* shown by a solid line shows a state in which the driven roller 31*b* is advanced with respect to the drive roller 31*a*, and a reference symbol 31*b*-1 shows a state in which the driven roller 31*b* is separated from the drive roller 31*a*.

The advance and retreat operation of the driven roller 31*b* with respect to the drive roller 31*a* is performed by the solenoid 71. When the solenoid 71 is in the turned on (energized) state, the driven roller 31*b* advances to and contacts on the drive roller 31*a*, and when the solenoid 71 is in the turned off (non-energized) state, the driven roller 31*b* retreats from the drive roller 31*a*.

The load when the drive roller 31*a* is driven in a state where the driven roller 31*b* is in contact with the drive roller 31*a* is the first load state. When the driven roller 31*b* retreats from the drive roller 31*a*, a second load state in which the load is smaller than that in the first load state is established.

Note that the load switching section may have other configurations as long as it can switch between the first load state and the second load state. For example, it may be configured by a rack and pinion mechanism or the like operated by a motor.

The driving force of the transport motor 53 is transmitted to the pinion gear 54, the gear 55, the gear 56, and the gear 57 in this order. The driving force of the transport motor 53 transmitted to the gear 57 is transmitted to the shaft 65 via the electromagnetic clutch 70. Both the gear 57 and the drive roller 31*a* are provided on the shaft 65, but the positions thereof are shifted in FIG. 2 for convenience of illustration.

Under the control of the control section 72, the electromagnetic clutch 70 is switched between a transmission state (clutch on) in which the driving force of the transport motor 53 is transmitted to the drive roller 31*a* by transmitting the rotation of the gear 57 to the shaft 65 and a non-transmission state (clutch off) in which the driving force of the transport motor 53 is not transmitted to the drive roller 31*a*.

The power transmission switching section may have other configurations as long as it can switch between a transmission state in which the power of the transport motor 53 is transmitted to the drive roller 31*a* and a non-transmission state in which the power of the transport motor 53 is not transmitted to the drive roller 31*a*. For example, one of the two gears that can mesh with each other may be displaceable, and a meshing state and a non-meshing state may be switched between using power of a motor, a solenoid, or the like.

First Embodiment

Next, a first embodiment of control performed by the control section 72 will be described with reference to FIGS. 3 and 4. The first embodiment of the control method of the power transmission apparatus 50A and the control method of the printer 1, as the medium transport apparatus or the recording apparatus, is realized by the control shown in FIGS. 3 and 4.

In the printing standby state, the electromagnetic clutch 70 is off, the solenoid 71 is off, and the driven roller 31*b* is retreated from the drive roller 31*a*. Further, the transport motor 53 is not operating, that is, is stopped.

In a case where a plurality of media are to be transported from this state, and in a case where transport of a first medium (first page) of media is to be started, the control section 72 starts the transport motor 53 (step S101) and turns on the electromagnetic clutch 70 (step S102). This timing corresponds to the timing T1 in FIG. 4. The start of the transport motor 53 and turning on of the electromagnetic clutch 70 may be performed at the same time, or one of them may be performed first.

After a waiting time wt (msec) (step S103) has elapsed, the solenoid 71 is turned on to bring the driven roller 31*b* into contact with the drive roller 31*a* (step S104, timing T2). That is, after the electromagnetic clutch 70 is turned on and waiting for a predetermined time, the solenoid 71 is turned on.

The waiting time wt (msec) is a time required to take up the slack of the backlash between the gears in the power transmission apparatus 50A, so that the teeth contact each other, and is desirably set as short as possible within this range.

Next, when the control section 72 determines that the leading edge of the medium is transported to a predetermined position (Yes in step S105), the control section 72 turns off the electromagnetic clutch 70 (step S106, timing T3). The predetermined position of the step S105 can be set to, for example, a position where the medium clings to the transport belt 13 or a nip position of the transport roller pair 32. Medium detection sensors (not shown) are provided at a position facing the transport belt 13 and upstream and downstream of the line head 44, and the control section 72 can grasp the position of the leading edge of the medium based on the detection information of the medium detection sensor.

Then, the control section 72 repeats steps S104 to S107 (No in step S107) until a last page is reached. When the last page is reached (Yes in step S107), the control section 72 stops the transport motor 53 (step S108), and turns off the solenoid 71 to retreat the driven roller 31*b* from the drive roller 31*a* (step S109). This timing corresponds to the timing Te in FIG. 4. Stopping of the transport motor 53, the turning off of the solenoid 71, and the turning off of the electromagnetic clutch 70 may be performed at the same time, or any of them may be performed first.

As described above, the control section 72 switches the electromagnetic clutch 70 from the non-transmission state (clutch off) to the transmission state (clutch on) while the load for driving the drive roller 31*a* is in the second load state, that is, when the driven roller 31*b* is separated from the drive roller 31*a*, and then switches the load by the solenoid 71 to the first load state, that is, to the state in which the driven roller 31*b* is in contact with the drive roller 31*a*, so it is possible to suppress meshing noise in which teeth of two gears mesh with each other when the electromagnetic clutch 70 is switched from the non-transmission state (clutch off) to the transmission state (clutch on).

Further, in the present embodiment, there is provided the driven roller 31*b*, as a driven section, which is driven to rotate by contact with the drive roller 31*a*, as a drive section, and the driven roller 31b can be displaced by the solenoid 71, as an example of a displacement mechanism, into a first position (position contacted to the drive roller 31a) for forming the first load state and a second position (position separated from the drive roller 31a) for forming the second load state. When the driven roller 31b is at the second position, the control section 72 switches the electromagnetic clutch 70 from the non-transmission state (clutch off) to the transmission state (clutch on). Accordingly, it is possible to suppress the meshing noise generated when the teeth of the two gears mesh with each other when the electromagnetic clutch 70 is switched from the non-transmission state (clutch off) to the transmission state (clutch on).

Further, as described above, when the load is in the second load state, the control section 72 switches the electromagnetic clutch 70 from the non-transmission state (clutch off) to the transmission state (clutch on) (step S102), and then switches the load from the second load state to the first load state by the solenoid 71 (step S104) to transport the first medium among the plurality of media (first page). When the first medium is transported by a predetermined amount (Yes in step S105), the electromagnetic clutch 70 is switched from the transmission state (clutch on) to the non-transmission state (clutch off) (step S106), and for the second and subsequent media (second and subsequent pages) among the plurality of media, while the load is maintained in the first load state, the electromagnetic clutch 70 is switched from the non-transmission state (clutch off) to the transmission state (clutch on) and from the transmission state (clutch on) to the non-transmission state (clutch off) each time the medium is transported (steps S104 to S107).

In this way, since the load is maintained in the first load state while a second and subsequent media among the plurality of media are transported until the transport of all the media ends, it is possible to improve quietness by suppressing the generation of sound generated by the solenoid 71.

When the second and subsequent media are transported, since the state in which the backlash between the gears is taken up is maintained, meshing noise when backlash between gears is taken up is not generated.

Second Embodiment

Next, a second embodiment of control performed by the control section 72 will be described with reference to FIGS. 5 and 6. The second embodiment of a control method of the power transmission apparatus 50A and the control method of the printer 1, as the medium transport apparatus or the recording apparatus, is realized by the control shown in FIGS. 5 and 6.

Figure 3:
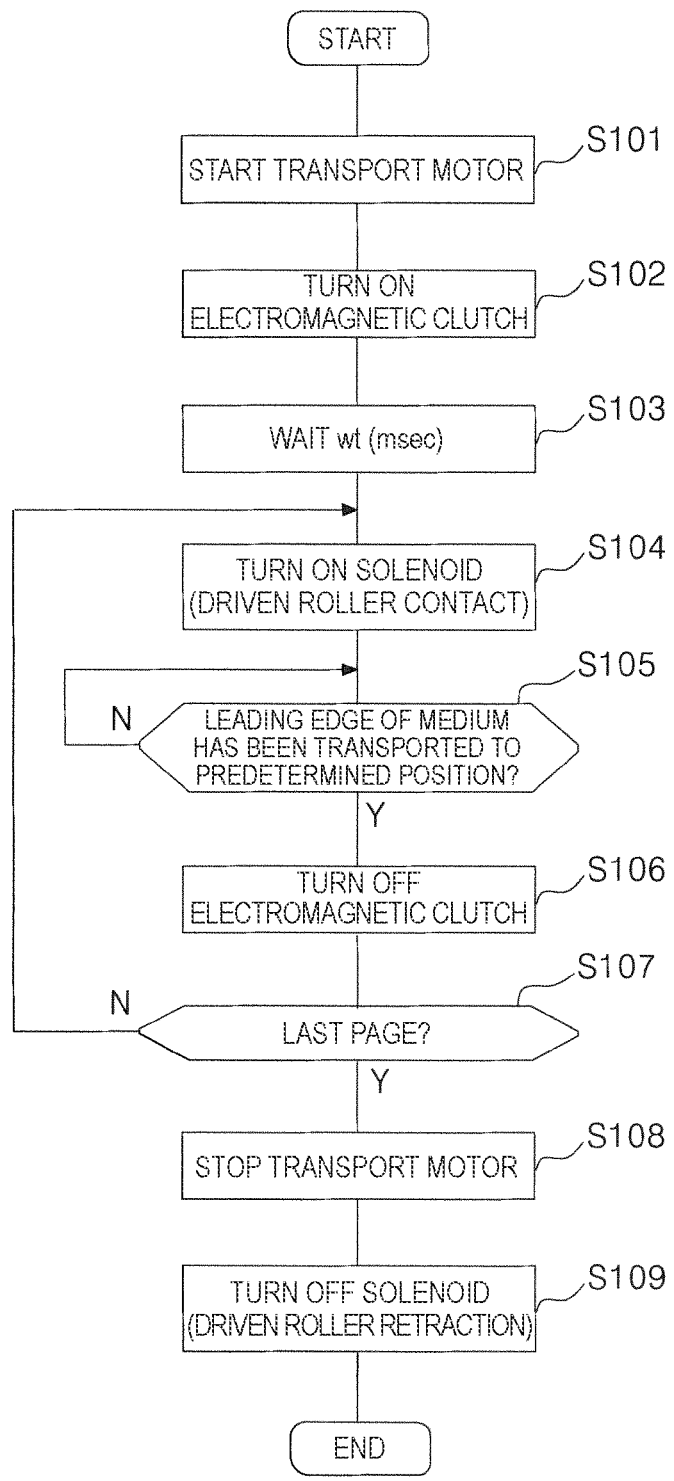
FIG. 3 is a flowchart illustrating a first embodiment of control executed by a control section.
Figure 4:
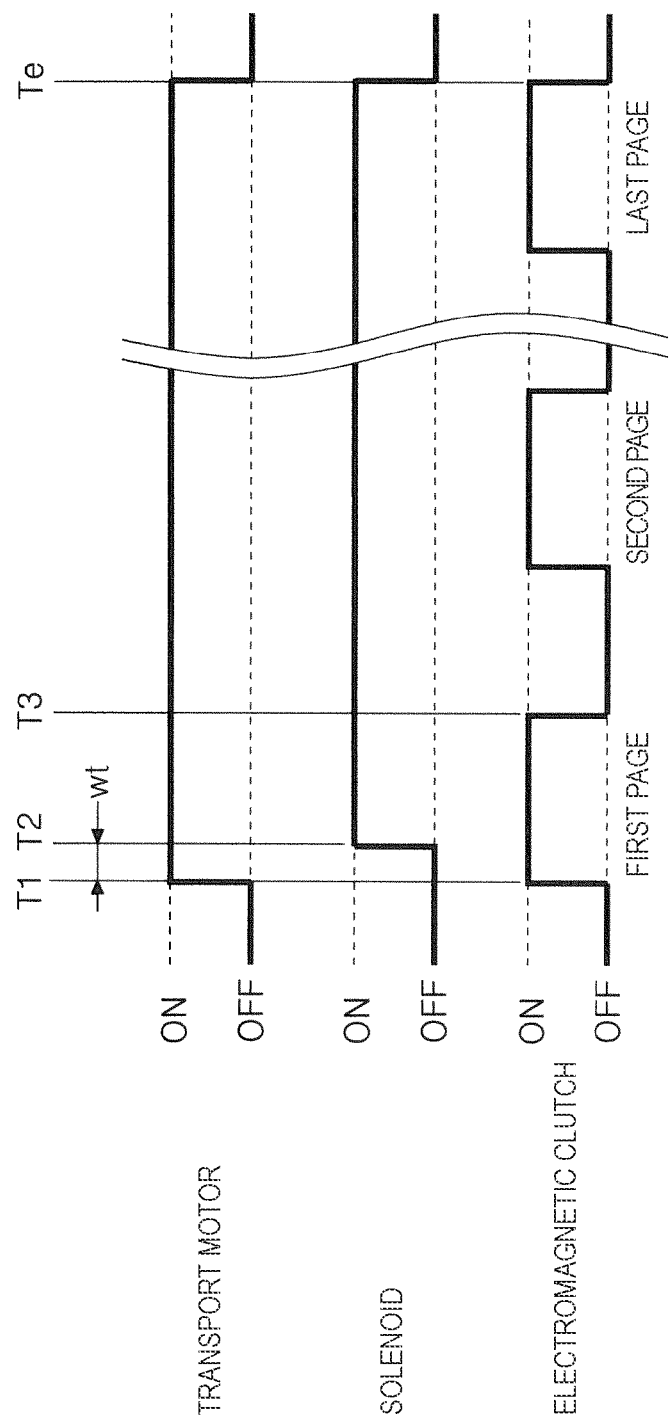
FIG. 4 is a timing chart showing the first embodiment of control executed by the control section.
Figure 5:
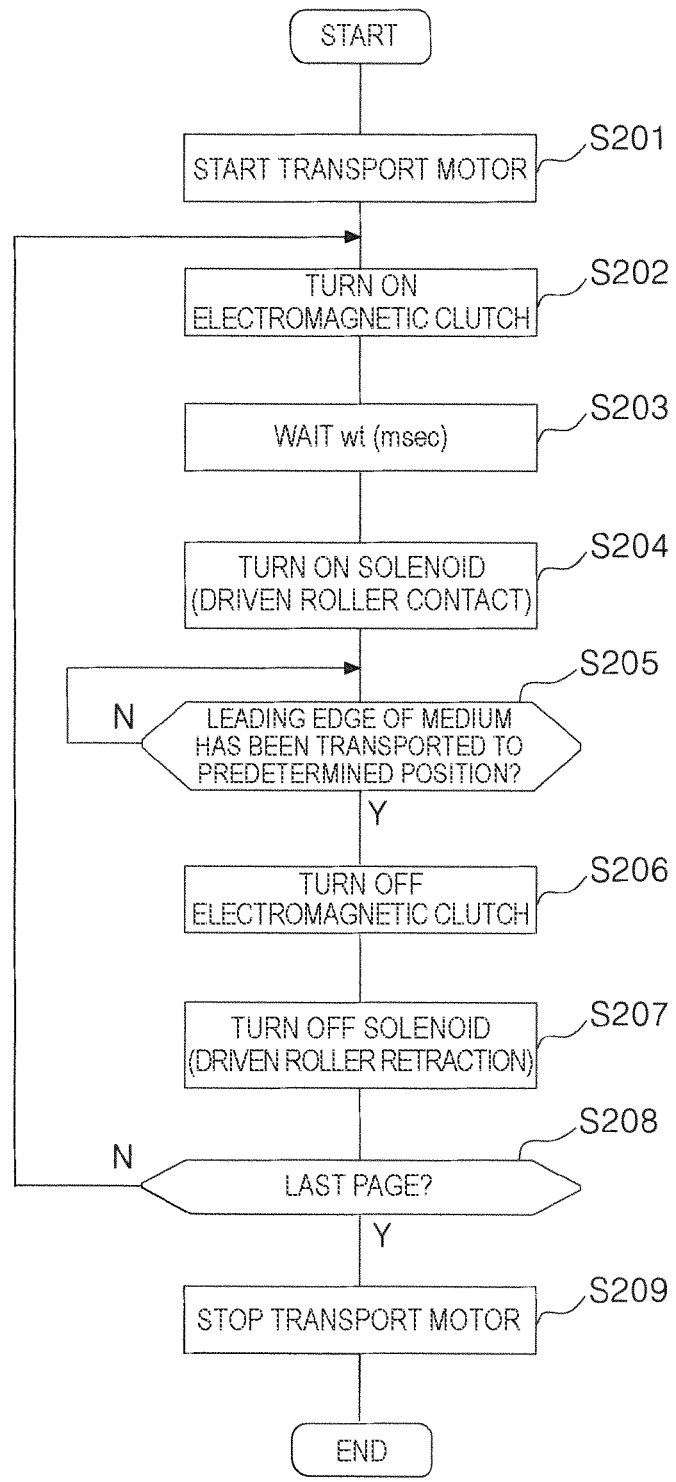
FIG. 5 is a flowchart illustrating a second embodiment of control executed by the control section.

Since steps S201 to S205 in FIG. 5 are the same as steps S101 to S105 in FIG. 3, description thereof is omitted.

When the leading edge of the medium is transported to the predetermined position (Yes in step S205), the control section 72 turns off the electromagnetic clutch 70 (step S206). Then, the solenoid 71 is turned off to retreat the driven roller 31b from the drive roller 31a (step S207). Step S206 and step S207 may be performed at the same time, or one of them may be performed first.

In the present embodiment, the control section 72 repeats steps S202 to S208 (No in step S208) until the last page is reached. When the last page is reached (Yes in step S208), the control section 72 stops the transport motor 53 (step S209, timing Te).

Figure 6:
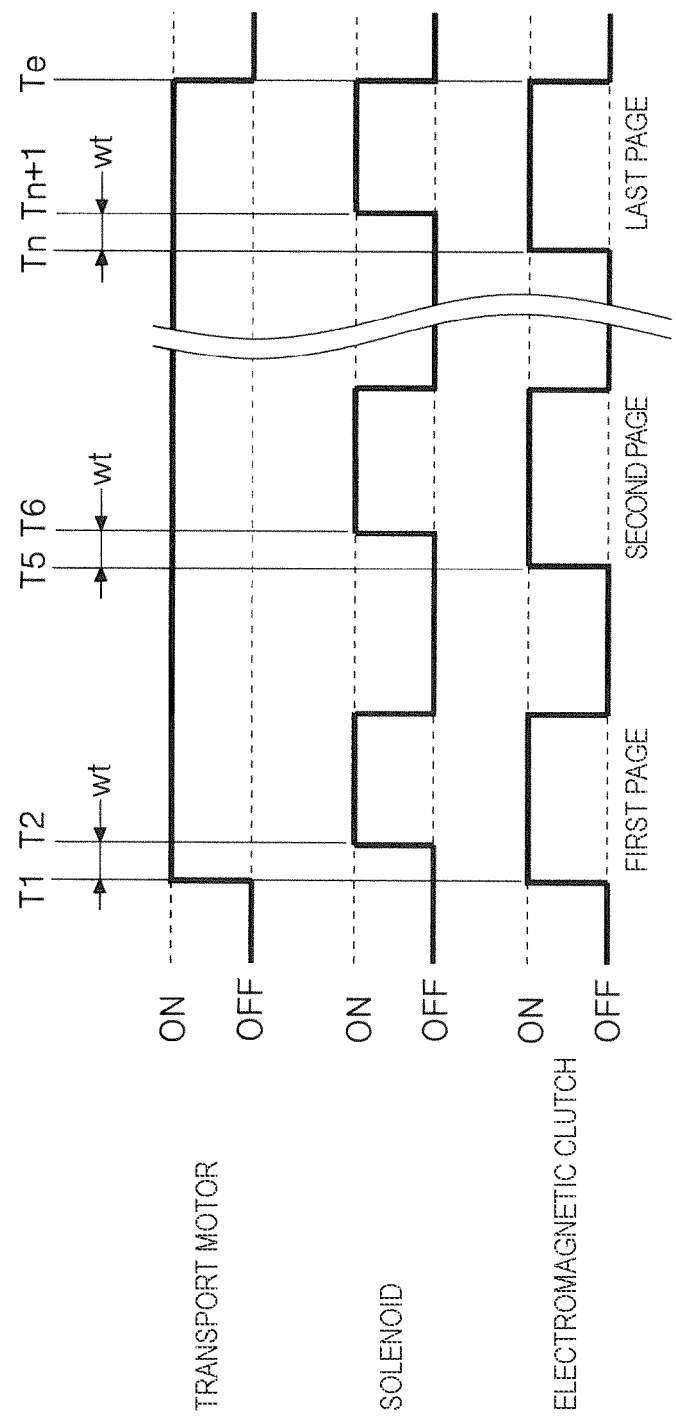
FIG. 6 is a timing chart showing the second embodiment of the control executed by the control section.

In FIG. 6, timings T5 and Tn are timings at which the same processing as timing T1 is performed, and timings T6 and Tn+1 are timings at which the same processing as timing T2 is performed (wherein n is an integer).

Also in this embodiment, at the timing Te, stopping of the transport motor 53, turning off of the solenoid 71, and turning off of the electromagnetic clutch 70 may be performed at the same time, or any of them may be performed first.

Also in the present embodiment, the control section 72 switches the electromagnetic clutch 70 from the non-transmission state (clutch off) to the transmission state (clutch on) while the load for driving the drive roller 31a is in the second load state, that is, when the driven roller 31b is separated from the drive roller 31a, and thereafter, switches the load by the solenoid 71 to the first load state, that is, the state in which the driven roller 31b is in contact with the drive roller 31a, so it is possible to suppress the meshing noise by teeth of two gears meshing with each other when the electromagnetic clutch 70 is switched from the non-transmission state (clutch off) to the transmission state (clutch on).

In addition, each time one medium is transported as described above, the control section 72 switches the electromagnetic clutch 70 from the non-transmission state (clutch off) to the transmission state (clutch on), and thereafter, executes a first control (step S202, S203, and S204) for switching the load from the second load state to the first load state by the solenoid 71, a second control (step S206) for switching the electromagnetic clutch 70 from the transmission state (clutch on) to the non-transmission state (clutch off) when the medium is transported by a predetermined amount, and a third control (step S207) for switching the load from the first load state to the second load state by the solenoid 71. Accordingly, it is possible to suppress wear of a members configuring the power transmission path from the transport motor 53 to the drive roller 31a.

Third Embodiment

Next, a third embodiment of control performed by the control section 72 will be described with reference to FIGS. 7 and 8. The third embodiment of a control method of the power transmission apparatus 50A and the control method of the printer 1, as the medium transport apparatus or the recording apparatus, is realized by the control illustrated in FIGS. 7 and 8.

Figure 7:
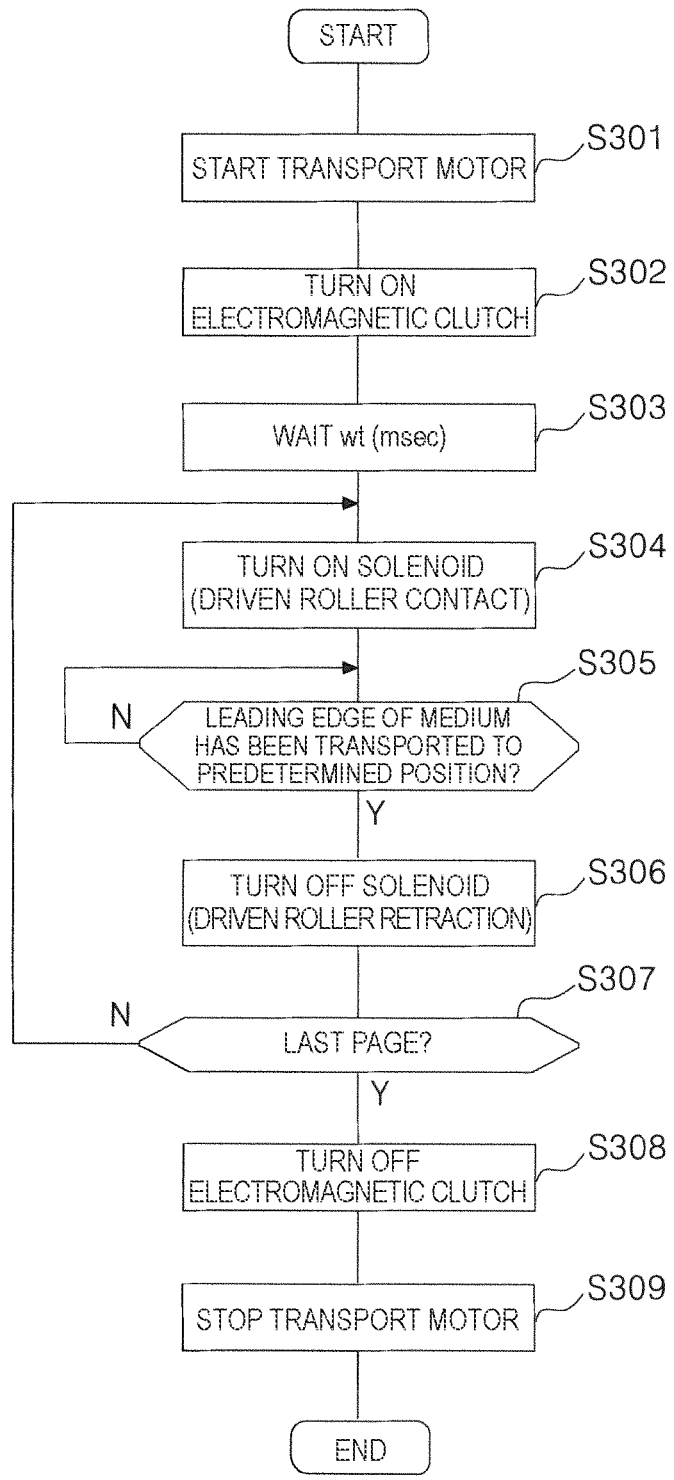
FIG. 7 is a flowchart illustrating a third embodiment of control executed by the control section.
Figure 8:
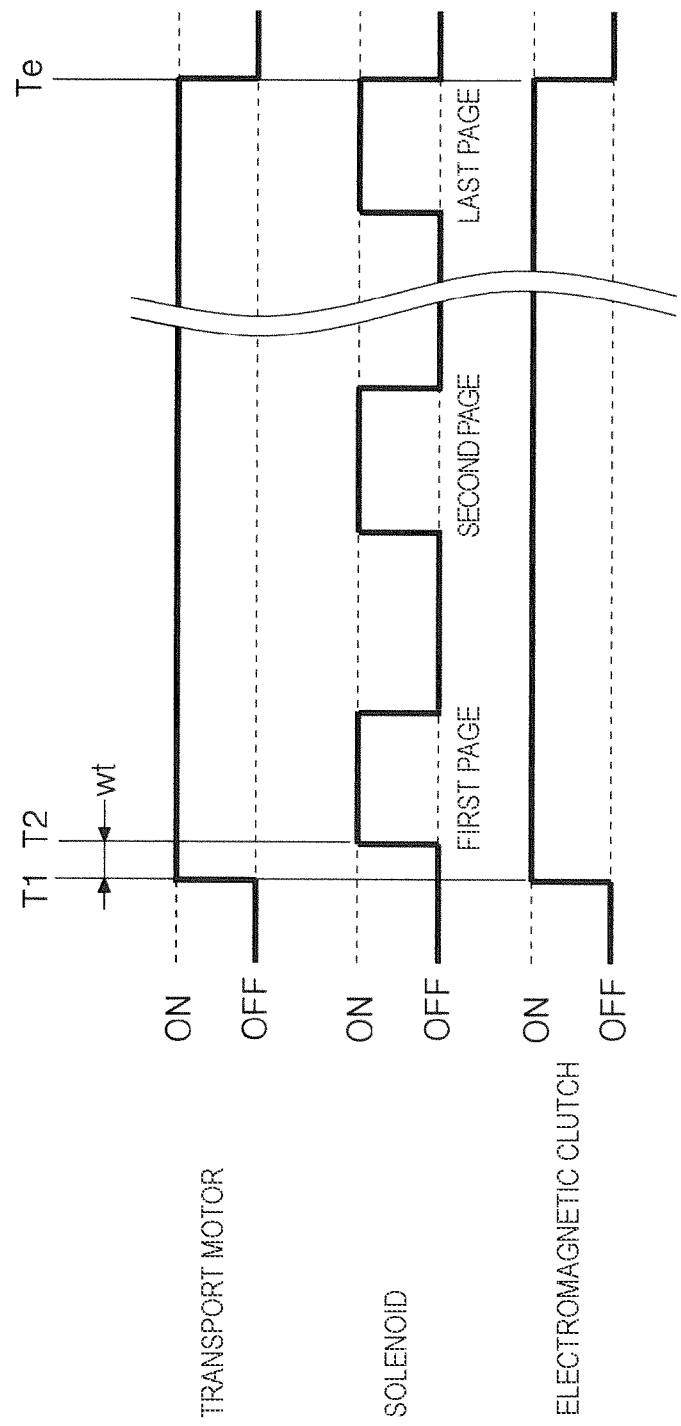
FIG. 8 is a timing chart showing the third embodiment of the control executed by the control section.

Since steps S301 to S305 in FIG. 7 are the same as steps S101 to S105 in FIG. 3, description thereof is omitted.

When the leading edge of the medium is transported to the predetermined position (Yes in step S305), the control section 72 turns off the solenoid 71 to retreat the driven roller 31b from the drive roller 31a (step S306).

In the present embodiment, the control section 72 repeats steps S304 to S307 (No in step S307) until the last page is reached. When the last page is reached (Yes in step S307), the control section 72 turns off the electromagnetic clutch 70 (step S308) and stops the transport motor 53 (step S309, timing Te).

Also in this embodiment, at the timing Te, stopping of the transport motor 53, turning off of the solenoid 71, and turning off of the electromagnetic clutch 70 may be performed at the same time, or any of them may be performed first.

Also in the present embodiment, the control section 72 switches the electromagnetic clutch 70 from the non-transmission state (clutch off) to the transmission state (clutch on) while the load for driving the drive roller 31a is in the second load state, that is, when the driven roller 31b is separated from the drive roller 31a, and thereafter, switches the load by the solenoid 71 to the first load state, that is, the state in which the driven roller 31b is in contact with the drive roller 31a, so it is possible to suppress the meshing noise by teeth of two gears meshing with each other when the electromagnetic clutch 70 is switched from the non-transmission state (clutch off) to the transmission state (clutch on).

In the present embodiment, for a second and subsequent medium among the plurality media, as described above the control section 72 maintains the electromagnetic clutch 70 in the transmission state (clutch on) while using the solenoid 71 to switch from the second load state to the first load state (step S304) and switching from the first load state to the second load state (step S306) each time a medium is transported.

As a result, it is possible to improve quietness by suppressing the generation of noise generated by the electromagnetic clutch 70.

Further, since the meshing noise generated when backlash between the gears is not generated in the second and subsequent media, the quietness can be enhanced by this as well.

Figure 9:
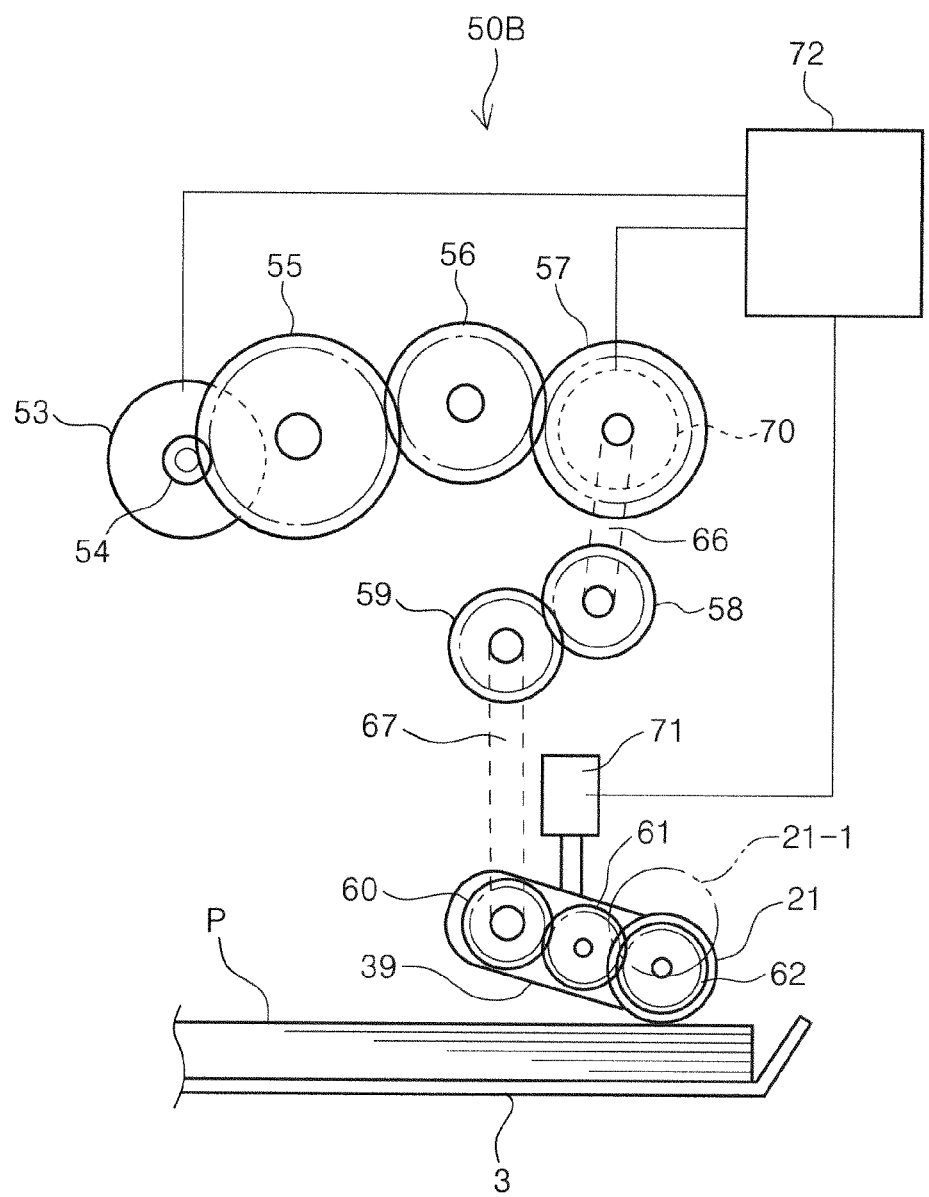
FIG. 9 is a diagram showing another configuration of a power transmission apparatus.

Next, another embodiment of a power transmission apparatus will be described with reference to FIG. 9. In FIG. 9, the same components as those described with reference to FIG. 2 are denoted by the same reference symbols, and a description thereof will not be repeated.

In the power transmission apparatus 50B according to the present embodiment, the pickup roller 21 is an example of the driven section and a drive roller that are driven by the transport motor 53. The pickup roller 21 is supported by a roller support member 39 that is swingable around a shaft 67, and advances and retreats with respect to a medium P in accordance with the swing of the roller support member 39. In FIG. 9, the pickup roller 21 indicated by a solid line indicates a state in which the pickup roller 21 has advanced to and contacts the uppermost medium P, and a reference symbol 21-1 indicates the pickup roller 21 retreated from the medium P.

The power of the transport motor 53 is transmitted to the gear 57 via the pinion gear 54, the gear 55, and the gear 56, and is transmitted to a shaft 66 via the electromagnetic clutch 70. Both the gear 57 and a gear 58 are provided on the shaft 66, but the positions thereof are shifted in FIG. 9 for convenience of illustration.

The gear 58 meshes with a gear 59, and the gear 59 transmits power to a gear 60 via the shaft 67. Both the gear 59 and the gear 60 are provided on the shaft 67, the positions thereof are shifted in FIG. 9 for convenience of illustration.

The power transmitted to the gear 60 is transmitted to the pickup roller 21 via a gear 61 and a gear 62.

Under the control of the control section 72, the electromagnetic clutch 70 is switched between a transmission state (clutch on), in which the power of the transport motor 53 is transmitted to the pickup roller 21 by transmitting the rotation of the gear 57 to the shaft 66, and a non-transmission state (clutch off), in which the power of the transport motor 53 is not transmitted to the pickup roller 21.

The swinging operation of the roller support member 39 is performed by the solenoid 71. When the solenoid 71 is in the on (energized) state, the pickup roller 21 is in contact with the uppermost medium P due to its own weight. When the solenoid 71 is in the off (non-energized) state, the roller support member 39 is pulled upward and retreated from the uppermost medium P. In addition, the relationship between on and off of the solenoid 71 may be reversed, that is, the pickup roller 21 may be pulled upward and retreated from the uppermost medium P in the state in which the solenoid 71 is off (non-energized), and the pickup roller 21 may in contact with the uppermost medium P in the state in which the solenoid 71 is on (energized).

In the state in which the pickup roller 21 is in contact with the uppermost medium P, the load when the pickup roller 21 is driven is the first load state. When the pickup roller 21 retreats from the uppermost medium P, the second load state is entered, in which the load is smaller than the load in the first load state. In this way, the contact state of the pickup roller 21 with respect to the medium P affects the load when driving the pickup roller 21.

Also in the present embodiment, the control according to the first embodiment described with reference to FIGS. 3 and 4, the control according to the second embodiment described with reference to FIGS. 5 and 6, or the control according to the third embodiment described with reference to FIGS. 7 and 8 can be employed.

That is, in this embodiment, the pickup roller 21, which is an example of the driven section, is displaced by the solenoid 71, which is an example of the displacement mechanism, between the first position, which is the position forming the first load state and in which the roller 21 is in contact with the uppermost medium P, and the second position, which is the position forming the second load state and in which the roller 21 is retreated from the uppermost medium P. When the pickup roller 21 is at the second position, the control section 72 switches the electromagnetic clutch 70 from the non-transmission state (clutch off) to the transmission state (clutch on). Accordingly, it is possible to suppress the meshing noise generated when the teeth of the two gears mesh with each other when the electromagnetic clutch 70 is switched from the non-transmission state (clutch off) to the transmission state (clutch on).

Note that when the first medium is to be transported in the first embodiment, the second embodiment, or the third embodiment described above, after the control section 72 switches the electromagnetic clutch 70 from the non-transmission state (clutch off) to the transmission state (clutch on) while the load for driving the driven section is in the second load state, and after the speed of the transport motor 53 is set to a first speed and the solenoid 71 switches the load from the second load state to the first load state, then the speed of the transport motor 53 may be set to a second speed higher than the first speed, and the medium may be transported at the second speed. Accordingly, it is possible to further suppress the meshing noise generated when the teeth of the two gears mesh with each other when the electromagnetic clutch 70 is switched from the non-transmission state (clutch off) to the transmission state (clutch on).

In addition, in the first embodiment, the second embodiment, or the third embodiment described above, the driven section is the drive roller 31a constituting the transport roller pair 31, but is not limited thereto, and may be a drive roller constituting another transport roller pair or a drive roller constituting a feed roller pair. In addition, in the first embodiment, the second embodiment, or the third embodiment described above, the driven section is the pickup roller 21, but is not limited thereto, and may be other pickup rollers (22 and 23) or a pickup roller that feeds the medium from a manual feed tray (not illustrated).

Further, the present disclosure is not limited to the embodiments and the modifications described above, and various modifications can be made within the scope of the disclosure described in the claims, and it goes without saying that such modifications are also included within the scope of the present disclosure.

What is claimed is:

1. A power transmission apparatus comprising:
a drive source;
a power transmission switching section configured to switch between a transmission state in which power of the drive source is transmitted to a driven section and a non-transmission state in which power of the drive source is not transmitted to the driven section;
a load switching section configured to switch between a first load state, which is a load while the driven section is driven, and a second load state, which is a load smaller than the load of the first load state; and
a control section configured to control the drive source, the power transmission switching section, and the load switching section, wherein
the control section switches the power transmission switching section from the non-transmission state to the transmission state while the load is in the second load state, and then uses the load switching section to switch the load from the second load state to the first load state,
the driven section is a drive roller configured to apply feeding force to a transported medium,
a driven roller is configured to advance and retreat with respect to the drive roller, and
the load switching section forms the first load state by bringing the driven roller into contact with the drive roller, and forms the second load state by separating the driven roller from the drive roller.

2. The power transmission apparatus according to claim 1, wherein the load switching section is constituted by a solenoid.

3. The power transmission apparatus according to claim 1, wherein the power transmission switching section is constituted by an electromagnetic clutch.

4. A medium transport apparatus comprising:
the power transmission apparatus according to claim 1, and
a medium transport path configured to transport the medium, wherein
the drive roller applies the feeding force to the medium in the medium transport path.

5. The medium transport apparatus according to claim 4, further comprising:
a medium support section configured to support the medium before feeding, wherein
the drive roller is a pickup roller configured to advance and retreat with respect to the medium supported by the medium support section and
the load switching section forms the first load state by bringing the pickup roller into contact with the medium, and forms the second load state by separating the pickup roller from the medium.

6. A recording apparatus comprising:
the medium transport apparatus according to claim 4 and
a recording section configured to perform recording on a medium being transported.

7. The medium transport apparatus according to claim 1, wherein when a plurality of media are consecutively transported, the control section executes the following processes:
switching the power transmission switching section from the non-transmission state to the transmission state while the load is in the second load state, and then using the load switching section to switch the load from the second load state to the first load state to transport a first medium among the plurality of media,
when the first medium is transported by a predetermined amount, switching the power transmission switching section from the transmission state to the non-transmission state, and
for a second and subsequent media among the plurality of media, maintaining the load in the first load state and, each time a medium is transported, switching the power transmission switching section from the non-transmission state to the transmission state and from the transmission state to the non-transmission state.

8. The medium transport apparatus according to claim 7, wherein
the drive source is a motor,
when the first medium is to be transported and the power transmission switching section switches from the non-transmission state to the transmission state while the load is in the second load state, the control section sets the speed of the motor to a first speed, and,
after using the load switching section to switch the load from the second load state to the first load state, sets the speed of the motor to a second speed higher than the first speed, and transports the medium at the second speed.

9. The medium transport apparatus according to claim 1, wherein
when a plurality of media are consecutively transported, the control section executes the following processes each time a single sheet of medium is transported:
a first control of switching the power transmission switching section from the non-transmission state to the transmission state while the load is in the second load state, and then using the load switching section to switch the load from the second load state to the first load state,
a second control of, when the medium is transported by a predetermined amount, switching the power transmission switching section from the transmission state to the non-transmission state, and
a third control of using the load switching section to switch the load from the first load state to the second load state.

10. The medium transport apparatus according to claim 1, wherein when a plurality of media are consecutively transported, the control section executes the following processes:
switching the power transmission switching section from the non-transmission state to the transmission state while the load is in the second load state, and then using the load switching section to switch the load from the second load state to the first load state to transport a first medium among the plurality of media,
when the first medium is transported by a predetermined amount, using the load switching section to switch the load from the first load state to the second load state, and
for a second and subsequent media among the plurality of media, maintaining the power transmission switching section in the transmission state and, each time a medium is transported, using the load switching section to switch from the second load state to the first load state and to switch from the first load state to the second load state.

11. The power transmission apparatus according to claim 1, wherein one or more gears are disposed between the power transmission switching section and the load switching section.

12. A control method for a power transmission apparatus, the power transmission apparatus including:

a drive source;

a power transmission switching section configured to switch between a transmission state in which power of the drive source is transmitted to a driven section and a non-transmission state in which power of the drive source is not transmitted to the driven section; and a load switching section configured to switch between a first load state, which is a load while the driven section is driven, and a second load state, which is a load smaller than the load of the first load state, the control method comprising:

a control section switching the power transmission switching section from the non-transmission state to the transmission state while the load is in the second load state, and then using the load switching section to switch the load from the second load state to the first load state, wherein the control section, the load switching section, and the power transmission switching section are separate from each other, the control section independently controls the load switching section and the power transmission switching section, the driven section is a drive roller that applies feeding force to a medium, a driven roller is configured to advance and retreat with respect to the drive roller, and the load switching section forms the first load state by bringing the driven roller into contact with the drive roller, and forms the second load state by separating the driven roller from the drive roller.

13. The control method according to claim 12, wherein when a plurality of media are consecutively transported, the control method executes the following processes:

switching the power transmission switching section from the non-transmission state to the transmission state while the load is in the second load state, and then using the load switching section to switch the load from the second load state to the first load state to transport a first medium among the plurality of media, when the first medium is transported by a predetermined amount, switching the power transmission switching section from the transmission state to the non-transmission state, and subsequently, maintaining the load in the first load state and, each time a medium is transported, switching the power transmission switching section from the non-transmission state to the transmission state and from the transmission state to the non-transmission state.

14. The control method according to claim 12, wherein when a plurality of media are consecutively transported, the control method executes the following processes each time a single sheet of medium is transported:

a first control of switching the power transmission switching section from the non-transmission state to the transmission state while the load is in the second load state, and then using the load switching section to switch the load from the second load state to the first load state, a second control of, when the medium is transported by a predetermined amount, switching the power transmission switching section from the transmission state to the non-transmission state, and a third control of using the load switching section to switch the load from the first load state to the second load state.

* * * * *